No. 646,332. Patented Mar. 27, 1900.
H. S. VAN DER STEMPEL.
MEANS FOR REPAIRING PNEUMATIC TIRES.
(Application filed Aug. 28, 1899.)

(No Model.)

Witnesses:
Inventor
Herman Salomon van der Stempel

THE NORRIS PETERS CO., PHOTO-LITHO., WASHINGTON, D. C.

UNITED STATES PATENT OFFICE.

HERMAN SALOMON VAN DER STEMPEL, OF AMSTERDAM, NETHERLANDS.

MEANS FOR REPAIRING PNEUMATIC TIRES.

SPECIFICATION forming part of Letters Patent No. 646,332, dated March 27, 1900.

Application filed August 28, 1899. Serial No. 728,776. (No model.)

*To all whom it may concern:*

Be it known that I, HERMAN SALOMON VAN DER STEMPEL, medical student, a subject of the Queen of the Netherlands, residing at 27 Vondelstraat, Amsterdam, in the Kingdom of the Netherlands, have invented certain new and useful Improved Means for Repairing Pneumatic Tires, of which the following is a specification, reference being had to the accompanying drawings, in which—

Figure 1:
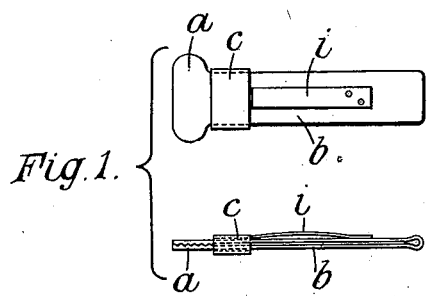
Figure 2:
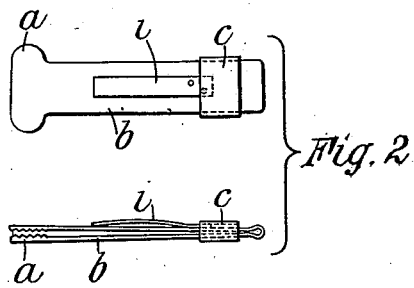
Figure 3:
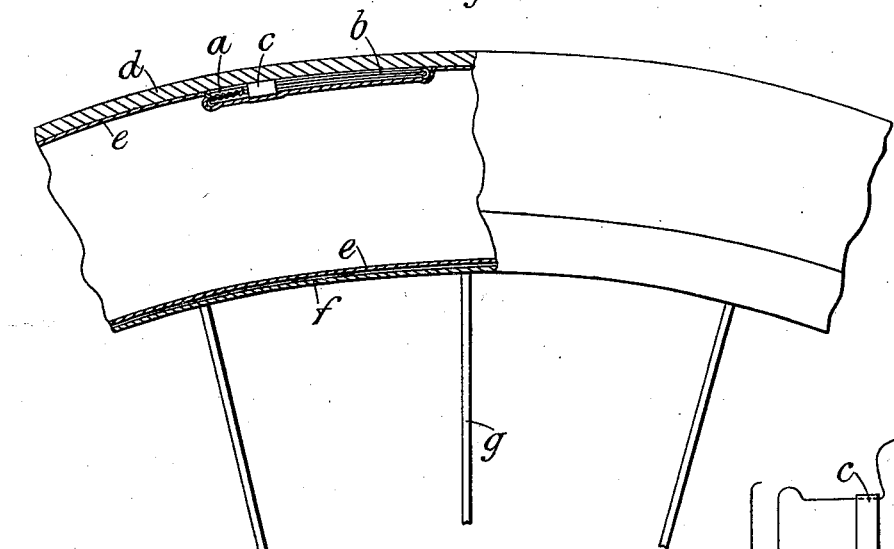
Figure 4:
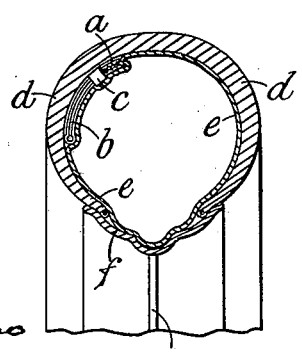
Figure 5:
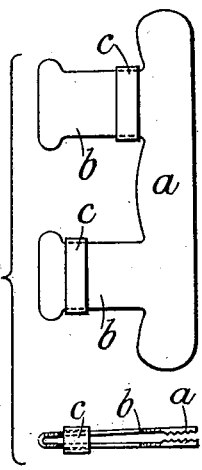

Figure 1 shows my improved tire-repairing instrument in its closed position, and Fig. 2 in its open position in front and side elevation, while Figs. 3 and 4 are partial longitudinal and transverse sections, respectively, showing the method in which the instrument is employed for repairing a leaky pneumatic wheel-tire. Fig. 5 shows in front and side elevation a modification of my improved instrument adapted for closing slits of considerable width.

This invention relates to a small instrument for repairing punctures and slits in pneumatic tires, which instrument is preferably called by the name of "rapid tire-repairer."

Every cyclist knows how inconvenient it is when from any cause the pneumatic tire becomes leaky and the air escapes therefrom during a journey. An occurrence of this kind can be provided against by a cyclist and means for repairing the tire can be carried; but not only is the method in which a repair of this kind is effected with the means heretofore usually employed extremely slow and laborious, but it is, moreover, uncertain in the highest degree and one has the prospect on reinflating the tire of discovering that the repair was not successful. Also only a few cyclists have the necessary skill to carry out a repair of this kind successfully and most of them in such cases have to seek help from others. In many cases this help is not to be had in the immediate neighborhood, and therefore one is consequently obliged to cover the intervening distance on foot and to wheel one's cycle to the place where the services of a skilled workman can be obtained.

The object of the present invention is to produce an instrument which can be conveniently carried and easily manipulated by any cyclist and by the aid of which one can make a leaky tire again serviceable in a short time.

The new rapid tire-repairer is a pair of nippers or tweezers formed by bending thin pliable sheet metal and the extended and grooved end surfaces of which can be pressed together by means of a slide. The front part $a$ of the pair of nippers is made somewhat broader than the stem or body thereof and is provided on the inner side with shallow grooves. Over the stem or body $b$ a flat ring $c$ can be pushed from the back right up to the jaws $a$.

Fig. 2 shows the position of the instrument when ready for use, the jaws $a$, of pliable metal easily bent or folded, being separated to a short distance from each other.

The operation of the instrument is as follows: After the outer india-rubber sheath or cover is removed the puncture or the otherwise torn or damaged part has to be located on the air-tube. When the place has been found, the air-tube is grasped at this place between the thumb and the first finger of the left hand and the nippers are pushed over it by the right hand in such a manner that the india-rubber is held folded or doubled between the extended ends of the nippers and can be clamped securely together by pushing the flat ring $c$ toward the ends of the nippers. Since the hole then lies between the jaws of the nippers, a perfect closure of the hole is effected by the instrument. The instrument is then folded or turned down and the outer sheath or cover can be replaced, the folding or turning of the instrument being rendered possible and easy by constructing the parts of pliable metal which can be readily folded and will retain the form into which bent or folded.

In Figs. 3 and 4 the position of the instrument is shown when the repaired tire is again inflated. $d$ is the outer india-rubber sheath or cover, $e$ the pneumatic tire or air-tube, $f$ the wheel tire or rim, and $g$ the spokes, of a velocipede.

The instrument is applied according to the position of the leaky part or according to the longitudinal direction of the slit, and then the nippers being of pliable and foldable metal can be easily bent and given a curvature corresponding to that of the tire, Fig. 3, or corresponding to the circumference of the transverse section of the tire, Fig. 4, or the nippers are left quite straight, if desired, as shown in Figs. 1 and 2.

It will be seen that the air-tube when the instrument is turned down allows itself to easily bend around the said instrument and on inflation of the tire adheres quite close to the instrument, so that the latter is inclosed between the two tires. It can remain there during the remainder of the journey without the least inconvenience, and the tire can be repaired properly on returning home.

The jaws $a$ are made sufficiently wide to enable not only punctures, but also slits, to be closed by the instrument. If the slit is of considerable width, a special form of instrument (shown in Fig. 5) is employed. This instrument comprises jaws $a$ of suitable width having two or more stems $b$, each provided with a clamping-ring $c$. This instrument is applied in a similar manner to that shown in Figs. 1 and 2, or, if desired, two instruments of either form can be arranged close up against each other. The ring is pushed up so tight that displacement thereof in a rearward direction by itself or opening of the nippers and the release of the fold in the tire can never take place. A spring catch or detent $i$ is, however, also provided on one of the limbs of the said nippers or tweezers, this catch being adapted to engage with the slide-ring $c$ when near the jaws $a$ and prevent it from slipping back during the motion of the wheel and allowing the said jaws to separate and release the part of the air-tube lying between them.

If desired, the jaws $a$ can be covered with india-rubber or other yielding material to prevent risk of damage being done to the air-tube by the said jaws.

The advantages of this rapid tire-repairer compared with the methods heretofore usually employed are:

First. The great number of articles—such as benzin, woolen rag, india-rubber solution, patches, emery or glass paper, &c.—which have been required heretofore by a cyclist for repairing a tire can now be dispensed with and instead of them a few of the above-described small instruments carried, which instruments can be conveniently kept in the waistcoat-pocket.

Second. A repair by the method heretofore generally employed takes at least one hour. With the new instrument forming the subject of my said invention the puncture can be closed in a few minutes.

Third. The methods heretofore usual require great skill and only a few cyclists are in the position to carry out a repair successfully in this way. On the other hand, the rapid tire-repairer can be used easily by anybody.

Fourth. A repair made by the old method is very unreliable, and it frequently happens on reinflating the tire that the labor of repairing it is found to have been wasted. The new instrument, on the other hand, never fails. The closure is perfect and the leaking of the tire at this place is out of the question.

What I claim is—

1. An instrument for repairing punctures and slits in pneumatic tires, consisting of a pair of nippers or tweezers made of pliable and foldable sheet metal with extended inelastic, pliable jaws grooved on the inner sides, and a flat ring adapted to slide on the stem or body of the said nippers or tweezers, said pliable jaws susceptible of being folded or turned down, substantially as, and for the purposes, hereinbefore described.

2. An instrument for repairing punctures and slits in pneumatic tires, consisting of a pair of nippers or tweezers of flat flexible sheet metal with extended jaws grooved on the inner sides, a flat ring adapted to slide on the stem or body of the said nippers or tweezers, and a detent mounted on said nippers and adapted to engage with said ring when in its locking position, substantially as, and for the purposes, hereinbefore described.

3. An instrument for repairing punctures and slits in pneumatic tires, consisting of a pair of nippers or tweezers made of flat flexible sheet metal with extended jaws, pads of yielding material on said jaws, a flat ring sliding on the stem or body of said nippers or tweezers, and a spring-catch for engaging said ring, substantially as, and for the purposes, specified.

4. An instrument for repairing slits and punctures in pneumatic tires, comprising a pair of pliable and foldable inelastic jaws connected by pliable and foldable inelastic tweezer stems or bodies, and flat rings sliding on the said pliable stems or bodies, substantially as, and for the purposes, hereinbefore described.

In witness whereof I have hereunto set my hand in presence of two witnesses.

HERMAN SALOMON VAN DER STEMPEL.

Witnesses:
 THOMAS HERMANN VERHAVE,
 AUGUST SIEGFRIED DOCER.